US010462031B1

(12) United States Patent
Nataraj et al.

(10) Patent No.: US 10,462,031 B1
(45) Date of Patent: Oct. 29, 2019

(54) NETWORK VISIBILITY FOR COTENANT PROCESSES

(71) Applicant: Cisco Technology, Inc., San Jose, CA (US)

(72) Inventors: Harish Nataraj, Berkeley, CA (US); Ajay Chandel, Fremont, CA (US); Naveen Kondapalli, San Ramon, CA (US); Prakash Kaligotla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 15/800,039

(22) Filed: Oct. 31, 2017

(51) Int. Cl.
*H04L 12/26* (2006.01)

(52) U.S. Cl.
CPC ........ *H04L 43/0882* (2013.01); *H04L 43/062* (2013.01); *H04L 43/0829* (2013.01); *H04L 43/0888* (2013.01); *H04L 43/16* (2013.01); *H04L 43/0805* (2013.01); *H04L 43/0894* (2013.01)

(58) Field of Classification Search
CPC ............... H04L 43/0882; H04L 43/062; H04L 43/0829; H04L 43/0888; H04L 43/16; H04L 43/0805; H04L 43/0894
See application file for complete search history.

(56) References Cited

U.S. PATENT DOCUMENTS

| 10,104,185 | B1* | 10/2018 | Sharifi Mehr | .......... H04L 67/16 |
| 2013/0067214 | A1* | 3/2013 | Tanaka | .................. H04L 9/0822 |
| | | | | 713/150 |
| 2018/0241811 | A1* | 8/2018 | Chen | ................... H04L 67/1008 |

* cited by examiner

*Primary Examiner* — Arvin Eskandarnia
(74) *Attorney, Agent, or Firm* — Behmke Innovation Group LLC; James Behmke; Stephen D. LeBarron

(57) ABSTRACT

In one embodiment, a network agent, associated with an operating system of a computing device, tracks socket connection calls made by a plurality of cotenant processes on the computing device that share a common network transport between the computing device and a remote computing device. The network agent may then extract a process identification (ID) for the socket connection calls, the process ID identifying which particular cotenant process of the plurality of cotenant processes is making each particular socket connection call. While monitoring network metrics of network traffic flows over socket connections between the computing device and the remote computing device, the network agent may attribute given network metrics from particular socket connections to a corresponding cotenant process based on the correlated process ID for the socket connection. As such, the network agent may then report the network metrics as attributed to the corresponding cotenant processes.

20 Claims, 10 Drawing Sheets

NETWORK VISIBILITY FOR COTENANT PROCESSES

TECHNICAL FIELD

The present disclosure relates generally to computer networks, and, more particularly, to network visibility for cotenant processes.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In one particular example, it can be difficult to determine the actual process participating at one end of a communication channel when multiple applications/processes operate on a single server and share the communication channel. For instance, such "cotenant" processes can appear as a single source or destination for traffic flows in a computer network without more sophisticated measures being taken. However, in many situations, such measures may be unavailable, such as where traffic is encrypted or where deep packet inspection (DPI) is too costly.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
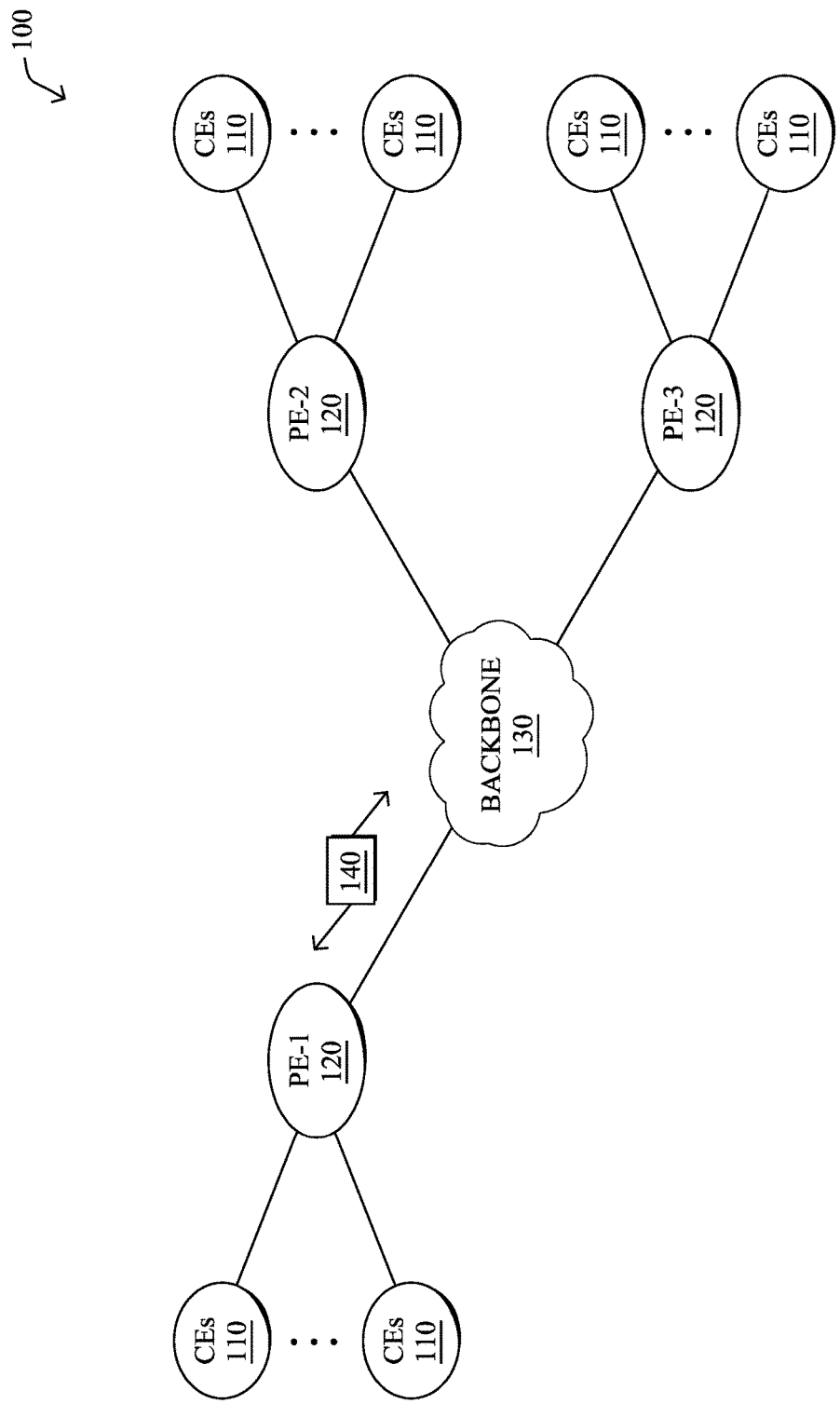
FIGS. 1A-1B illustrate an example computer network.

According to one or more embodiments of the disclosure, techniques herein provide for network visibility for cotenant processes. In particular, in one embodiment, a network agent, associated with an operating system of a computing device, tracks socket connection calls made by a plurality of cotenant processes on the computing device that share a common network transport between the computing device and a remote computing device. The network agent may then extract a process identification (ID) for the socket connection calls, the process ID identifying which particular cotenant process of the plurality of cotenant processes is making each particular socket connection call. While monitoring network metrics of network traffic flows over socket connections between the computing device and the remote computing device, the network agent may attribute given network metrics from particular socket connections to a corresponding cotenant process based on the correlated process ID for the socket connection. As such, the network agent may then report the network metrics as attributed to the corresponding cotenant processes.

In another embodiment, a controller receives first network metrics of network flows between a first computing device and a second computing device, the first network metrics received from a first network agent associated with the first computing device. The controller also receives second network metrics of the network flows as attributed to corresponding cotenant processes of the second computing device that share a common network transport between the second computing device and the first computing device, the second network metrics received from a second network agent associated with the second computing device and configured to attribute given network metrics from particular socket connections to a corresponding cotenant process based on a correlated process ID for the socket connection. Accordingly, the controller may then correlate the first and second network metrics, and generates a report of the correlated first and second network metrics, where the report comprises a breakdown of the second network metrics as attributed to corresponding cotenant processes of the second computing device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
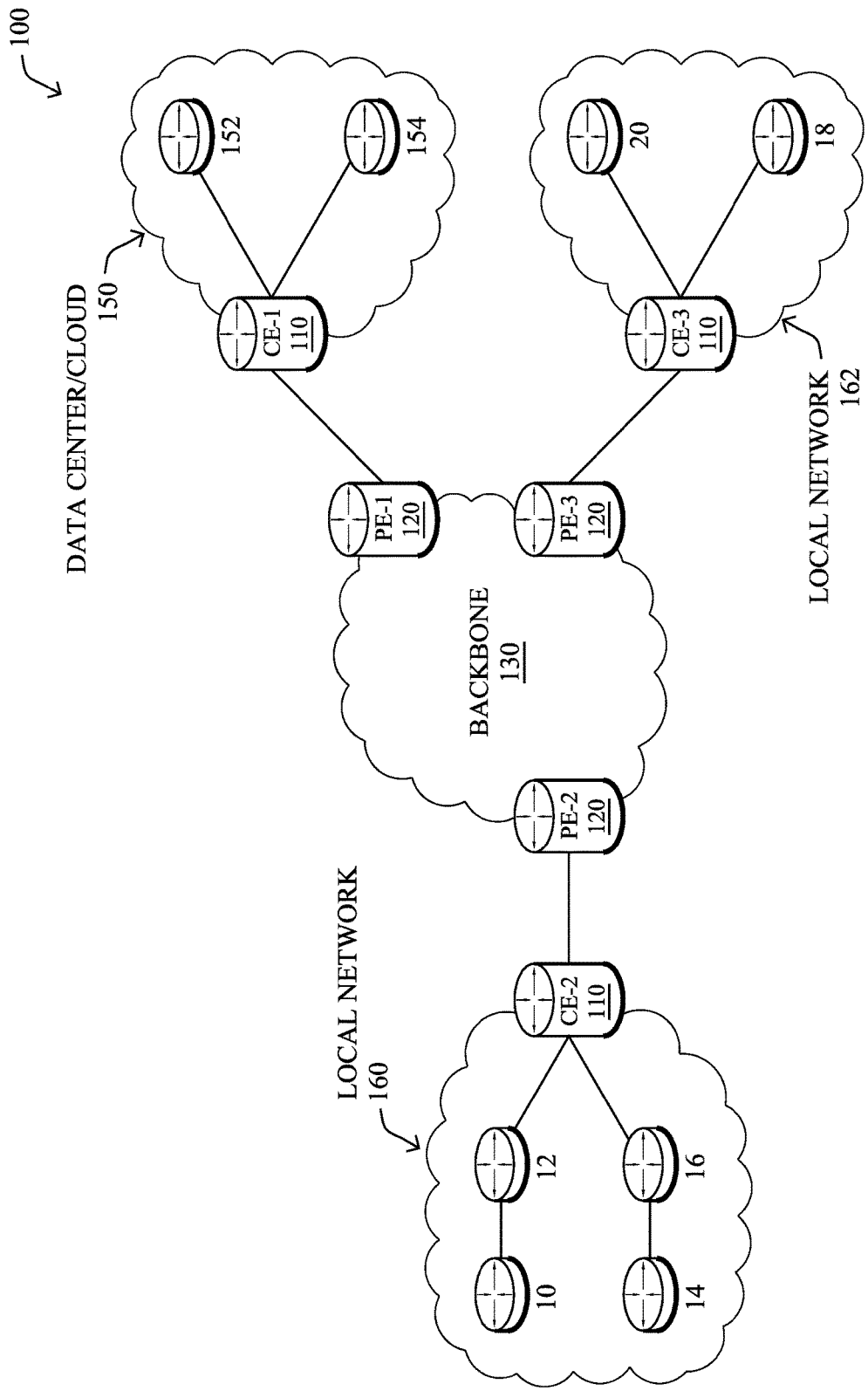

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
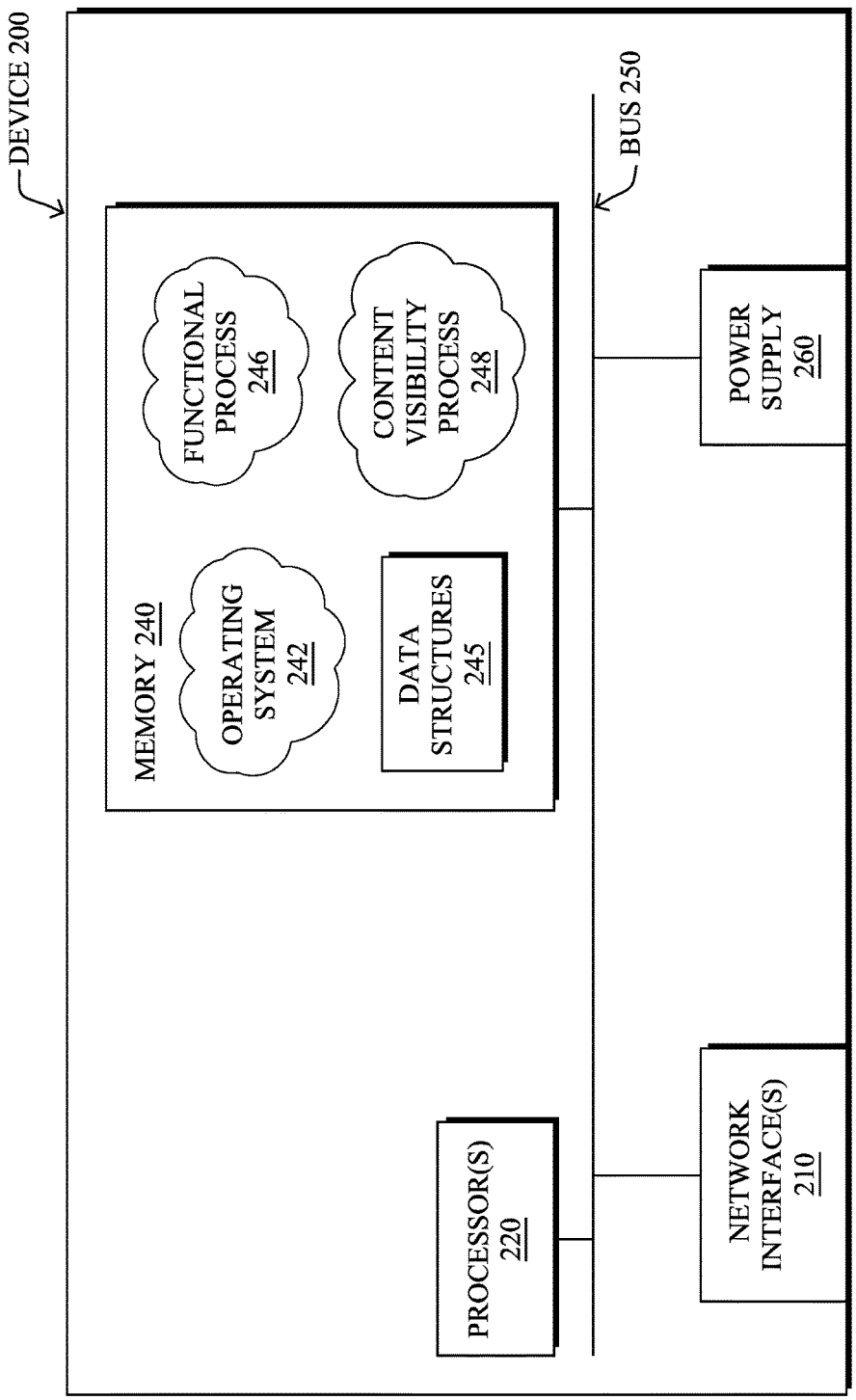
FIG. 2 illustrates an example computing device/node.

FIG. 2 is a schematic block diagram of an example computing device 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "cotenant visibility" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. For example, each node can include one or more machines that perform part of the applications. The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
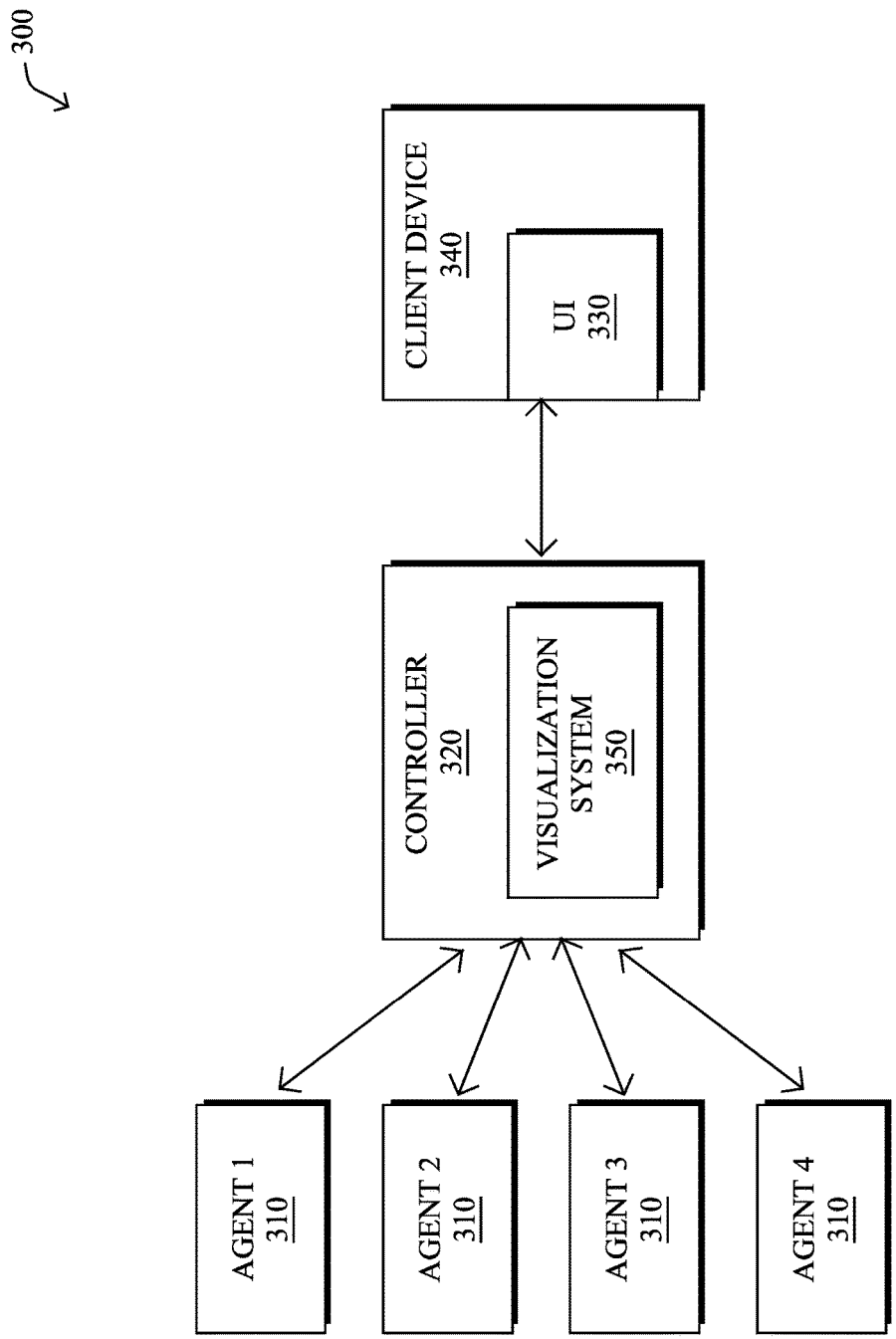
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premise (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Browser agents and mobile agents are generally unlike other monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
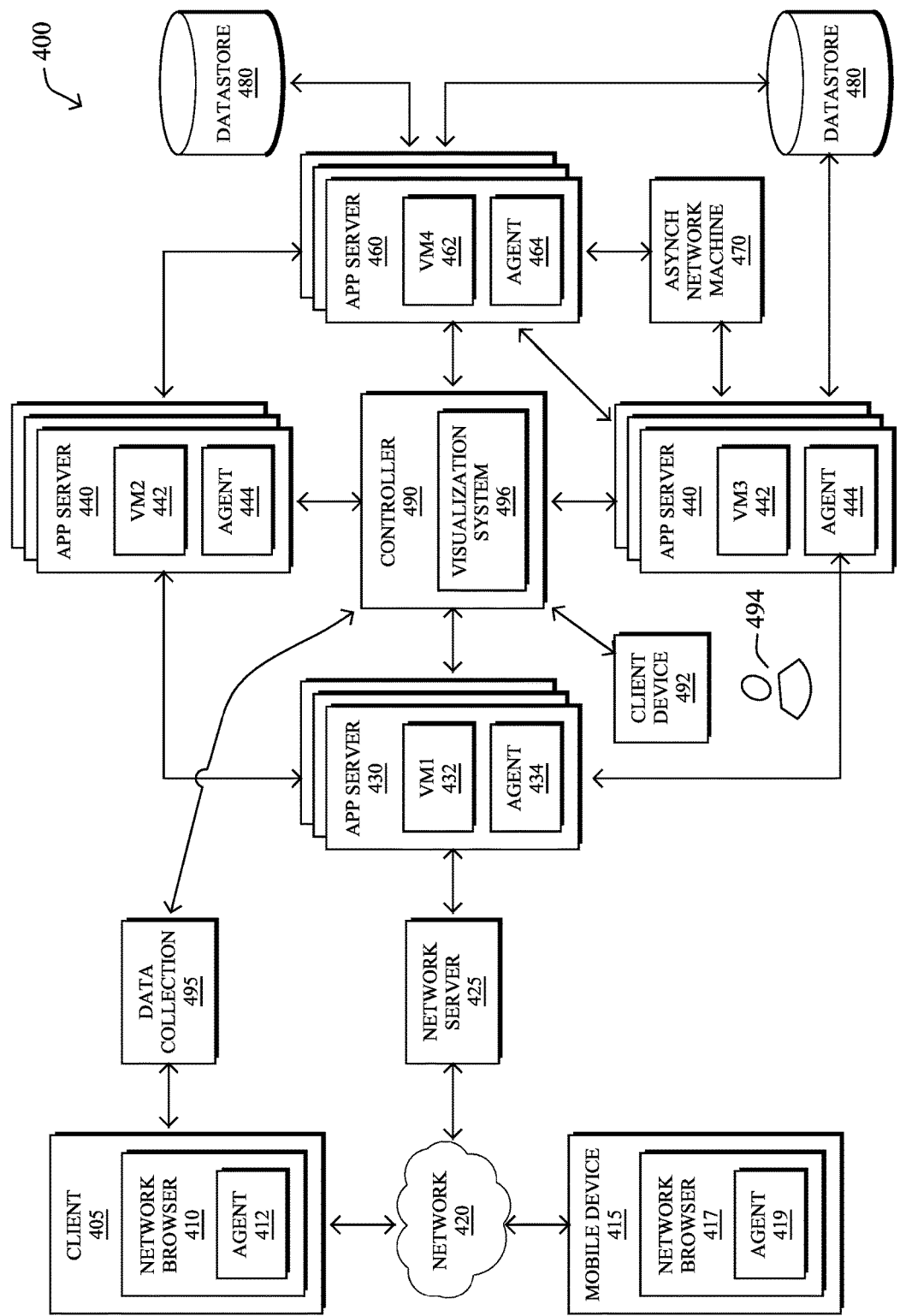
FIG. 4 illustrates an example system for an application-aware intrusion detection system.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
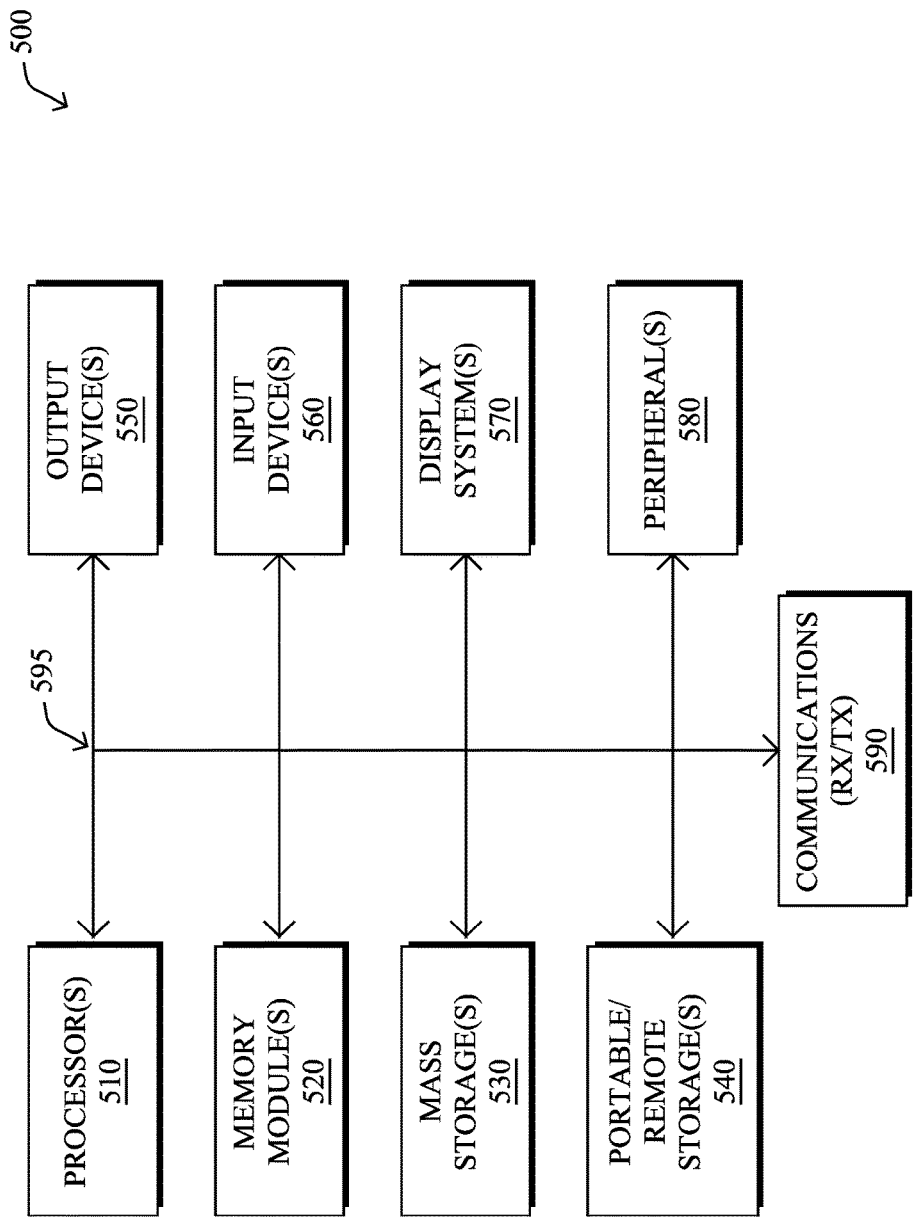
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Network Visibility for Cotenant Processes—

As noted above, it can be difficult to determine the actual process participating at one end of a communication channel when multiple applications/processes operate on a single server and share the communication channel. For instance, the challenge with cotenant processes is that they share a common network transport hence attribution of the metrics is a major problem, since such cotenant processes can appear as a single source or destination for traffic flows in a computer network (e.g., a server/host uses a single socket connection to talk to downstream or upstream peers).

Figure 6:
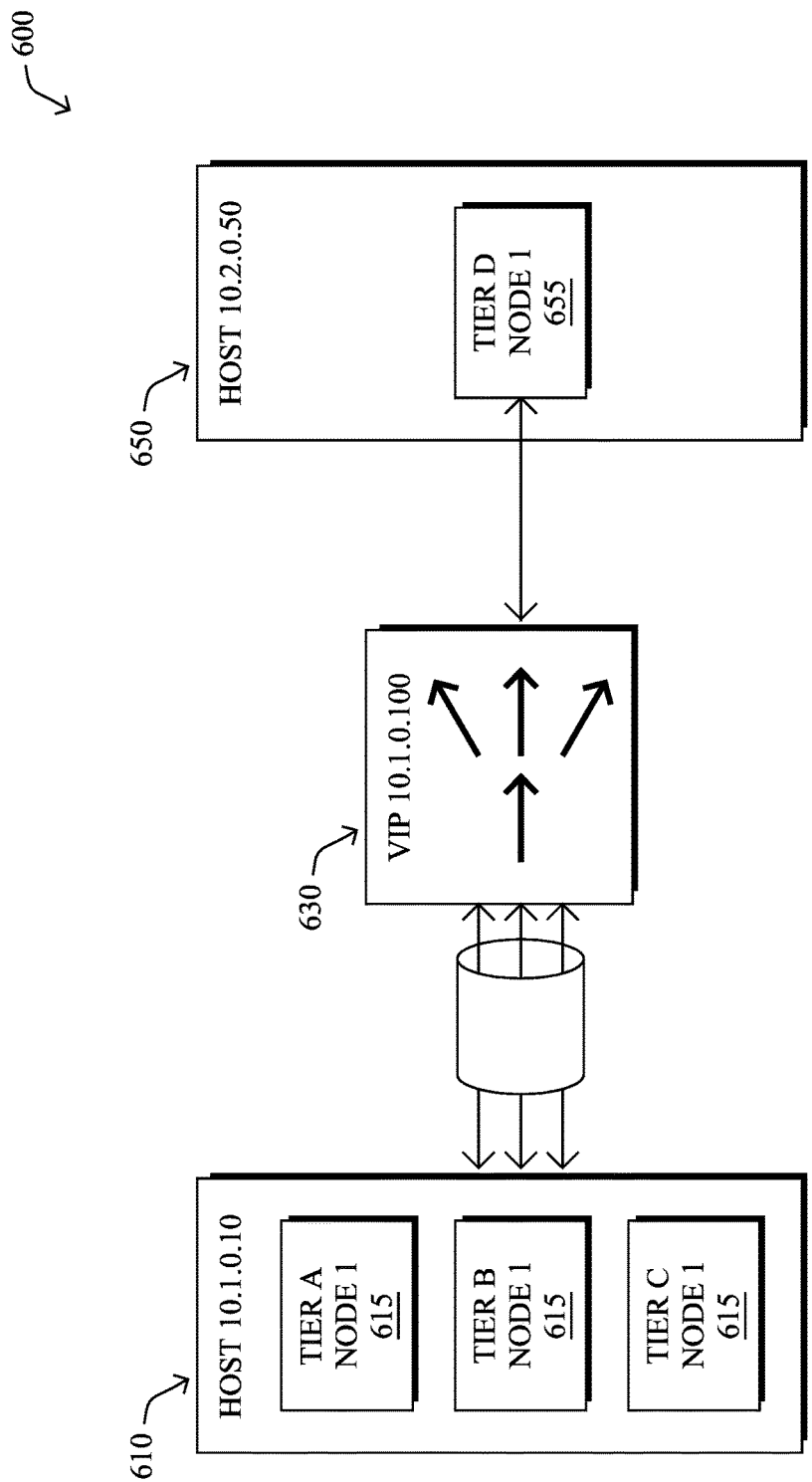
FIG. 6 illustrates an example of end-to-end communication.

For example, FIG. 6 illustrates an example connection environment 600 where a first host 610 (e.g., host 10.1.0.10) has three applications/processes 615 (e.g., Tier A, Tier B, and Tier C) communicating with a downstream application 655 (e.g., Tier D) on a remote host 650 (e.g., host 10.2.0.50) through a load balancer 630 (e.g., virtual IP or "VIP" 10.1.0.100). As an example, three different ecommerce applications may operate on a single server, and each of the applications may need to access credit card validation process on a remote server.

A network agent as described above would monitor the traffic between the Hosts and the load balancer, and correlates the metrics with the business transactions. Since the source and the destination are the same, however, the network agent will not be able to differentiate the traffic between the various applications (Tier A Node1, Tier B Node1, Tier C Node1). That is, network traffic is often distinguished based on the 4-tuples of the source IP address, source port, destination IP address, destination port, and a protocol. Unfortunately, in this instance, this TCP/IP information/socket would appear to be the same regardless of the application within the host 610, since it is the same physical connection between the devices. As a result of not knowing what application traffic corresponds to which network traffic, the same metrics would be reported against each node (that is, measuring a combination of metrics across the Tiers). For instance, if a 1% packet loss is occurring for the transactions between Tier A Node1 and Tier D Node 1, this would be reported as packet loss for all the transactions between Tier B Node1→Tier D Node 1 and Tier C Node1→Tier D Node1.

Various sophisticated measures may be taken to alleviate this problem, although not all of such measures are available in all different situations. For example, some techniques require deep packet inspection (DPI) to look beyond the TCP/IP header (e.g., into application layer headers or packet payloads), which can be difficult or too costly (in terms of expense and/or delay/processing). Also, many communication mediums are encrypted, which would require having the security key in order to inspect the packets. Still further techniques require different port information, but many applications use a generic predefined port such as 0, 80, 8080, etc. for their connections.

The techniques herein, therefore, propose a mechanism for network visibility for cotenant processes, providing awareness. In particular, the techniques herein propose a mechanism to attribute network metrics for cotenant processes, by illustratively instrumenting socket connections at the operating system (OS)/kernel level to differentiate the communications on the host of the cotenant processes for isolated metric processing and reporting.

Specifically, according to one or more embodiments herein, a network agent, associated with an operating system of a computing device, tracks socket connection calls made by a plurality of cotenant processes on the computing device that share a common network transport between the computing device and a remote computing device. The network agent may then extract a process identification (ID) for the socket connection calls, the process ID identifying which particular cotenant process of the plurality of cotenant processes is making each particular socket connection call. While monitoring network metrics of network traffic flows over socket connections between the computing device and the remote computing device, the network agent may attribute given network metrics from particular socket connections to a corresponding cotenant process based on the correlated process ID for the socket connection. As such, the network agent may then report the network metrics as attributed to the corresponding cotenant processes. In another embodiment, a controller may receive the report and can correlate metrics from different agents in order to generate a further report of the correlated metrics, where the report comprises a breakdown of the network metrics as attributed to corresponding cotenant processes.

Illustratively, the techniques described herein may be performed by hardware, software, and/or firmware, such as in accordance with the illustrative cotenant visibility process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

Operationally, the techniques herein provide a newly defined process for a network agent to classify the traffic on a host by tracking socket connection establishment, and for mapping application flows to network flows, accordingly. In one specific embodiment, this network agent process may be embodied as a library on the operating system of the host, where the library is preloaded with the applications for being invoked during connection calls as described below.

Figure 7:
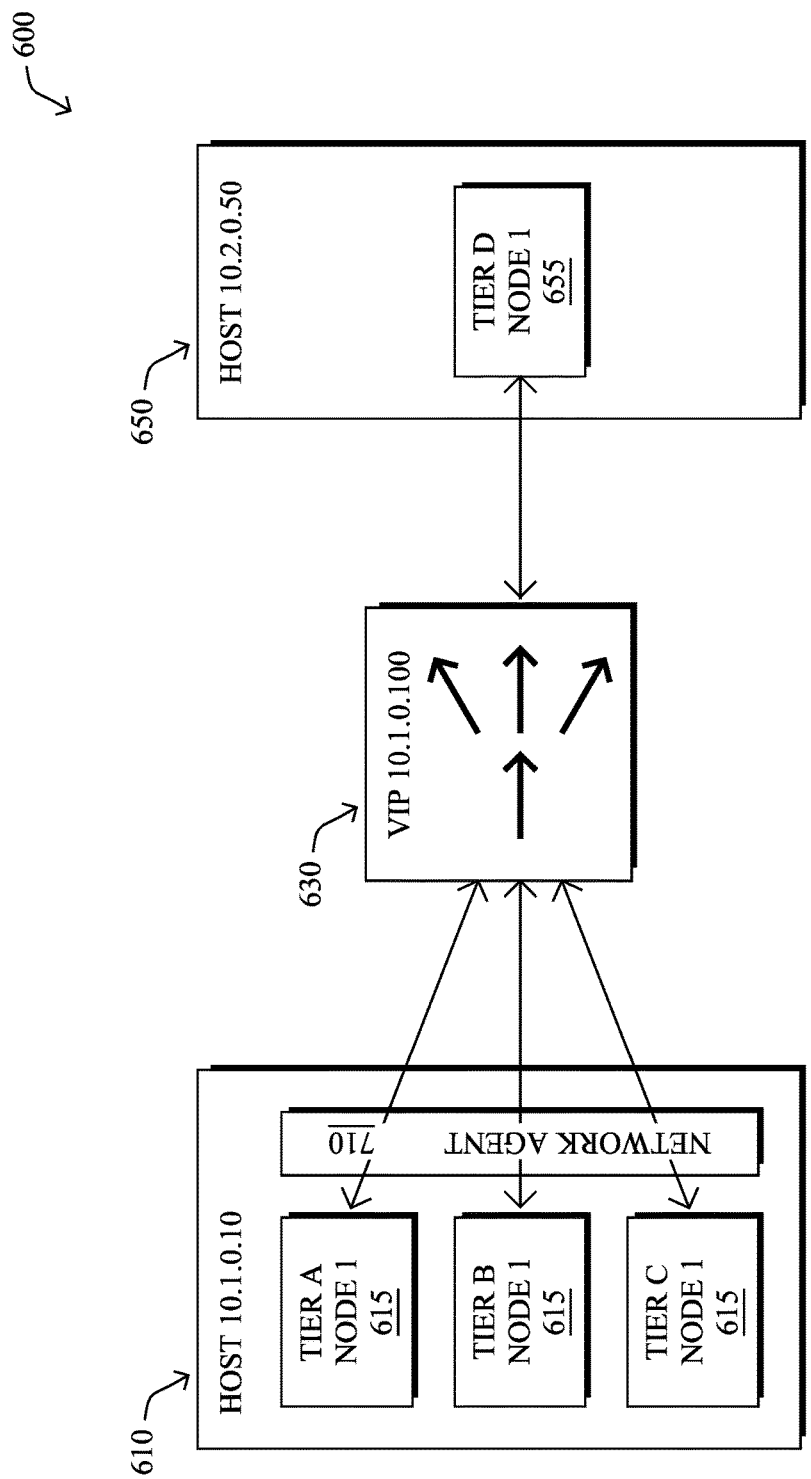
FIG. 7 illustrates an example of a network environment with network visibility for cotenant processes.

With reference to the updated network environment 700 of FIG. 7, a new network agent 710 is shown within the host 610, where each application 615 is configured to establish connections through this agent (e.g., when this particular feature is enabled, or else any time when the agent is installed on the kernel/OS of the host computing device). Illustratively, the agent 710 is located outside of the applications 615, and may be installed on the kernel layer of the host device. However, other configurations may be made, where such configurations can still provide visibility to the established connections of the applications, accordingly.

According to one or more embodiments of the present disclosure, to allow the network agent 710 to isolate traffic to particular application nodes/processes 615, the operating system of the host device 610 may instruct the applications 615 to use the network agent (or associated library) for any socket connections they are using (e.g., node 1 of tier A, node 1 of tier B, etc.). That is, whenever these applications attempt to establish a socket connection, an "LD-preload" function may be illustratively called for the OS to tell the node to use this overwritten library in its path, thus allowing the network agent to overtake the socket calls.

When the socket connection call comes to the network agent 710 from a process, the network agent extracts information from the socket call, such as the process identifier (ID) (among other things) for that particular socket connection. This process ID (also referred to as a PID) then allows the network agent to monitor traffic at the network level, while segregating the network traffic to the individual processes as described below. Said differently, by intercepting all socket connections at the kernel level (e.g., "socket connect" for outbound traffic, "socket accept" for inbound traffic, "socket close" calls, etc.), the process ID associated with the particular process issuing each of these calls can be determined, thus allowing the network agent 710 to monitor any traffic going over those connections while attributing gathered metrics to particular processes, accordingly. (Notably, the techniques herein work in both directions: transmitting and receiving. That is, which cotenant process is creating a connection or which cotenant process is accepting a connection).

For example, Tier C may be associated with one particular socket connection, Tier B is using another particular socket connection, and Tier A may be associated with a third particular socket connection, allowing the network agent 710 on the host device to classify the traffic per-process. Also, in the event multiple connections are made from the same process, e.g., Node 1 of Tier C is initiating three connections, the techniques herein may group those connections into one group coming out of this Tier C's Node 1.

A connection generally can be associated with at least a source IP, source port, a destination IP, destination port, and a protocol. The techniques herein recognize that all network connections going from this host to the VIP 630 will appear to be the same (i.e., all three processes use same 4-tuples). As such the techniques herein add the process ID as another attribute for grouping network metric collection—all connections coming from a particular application/node are grouped into that connection group. For instance, rather than changing/tagging packets in any way, the techniques herein can recognize when connections are coming out of the Tier A Node 1, and the corresponding traffic can be classified as the connection coming out of Tier A Node 1 and going to the VIP 630. Then another connection can be classified as coming out of Tier B Node 1 based on the socket connection call information, and put it into a different network metric collection group. In other words, according to the techniques herein, the process ID can now be used as a unique network handler in addition to the conventional use of 4-tuples as a unique network connection handler.

Notably, in one particular embodiment, the techniques herein may be a second level of instrumentation beyond application agents of the application intelligence platform described above. For instance, the techniques above may also perform some level of socket instrumentation from within an application. However, the techniques herein perform socket instrumentation outside the application layer, and rather take place at the kernel layer.

According to the techniques herein, without marking the traffic in any manner, only the cotenant process host device can differentiate the traffic according to the socket connection information. As such, in one or more embodiments herein, the network agent 710 may be configured to upload this data (isolated network traffic data) to a controller (320/490, above), so the controller can then process and display the throughput coming out of each of the cotenant processes/nodes 615. For example, a controller may be able to assess the information obtained to determine that three applications are using the same connection to a remote host (e.g., a same 1-Gig pipe), but the network metrics from the agent 710 can isolate this information, attributing certain metrics to certain processes (e.g., noting different throughputs or proportions of total connection throughput for each cotenant process, such as 80% traffic for an ecommerce application, 10% traffic for a database application, and 10% traffic for a security application).

Other metrics, such as packet drops, may also be attributed to particular cotenant processes according to the techniques herein. For instance, while generally it could be determined that a certain number of packet drops occurs on the connection, the techniques herein improve the granularity of the report to include which particular cotenant process is experiencing the drops (e.g., based on unacknowledged packets, error messages, etc., tied to the particular cotenant process's socket connection, all detectable by the network agent 710 on the cotenant process's host device).

Notably, the business transaction tracking techniques described above may also allow for a controller to correlate the isolated application traffic with certain GUIDs, e.g., locating issues with particular transactions, backtracking to network metrics attributed to particular processes. For example, it could be possible that Tier A sees a lot of lost transactions (e.g., lots of business transactions fail from Tier A), and the techniques herein would allow the controller to provide insight into network packet loss for Tier A as compared to Tiers B/C. If the packet loss rates are similar, then the problem is network related, and perhaps Tier A is more sensitive to packet drops. However, if the packet loss rate is greater for Tier A, then further troubleshooting and root cause analysis could be based specifically on Tier A's operation and configuration. (Note also that while the illustrative application intelligence platform above can mark packets with a GUID/transaction ID, which can then be correlated to particular processes, the techniques herein do not require DPI or any tagging at the HTTP/application level, and can be used with or without GUID marking.)

According to one or more embodiments herein, various remediation actions may be taken in response to a determination that a particular isolated cotenant process traffic flow is related to or affected by one or more detectable issues, such as delay, packet loss, transaction misdirection, etc.

Figure 8:
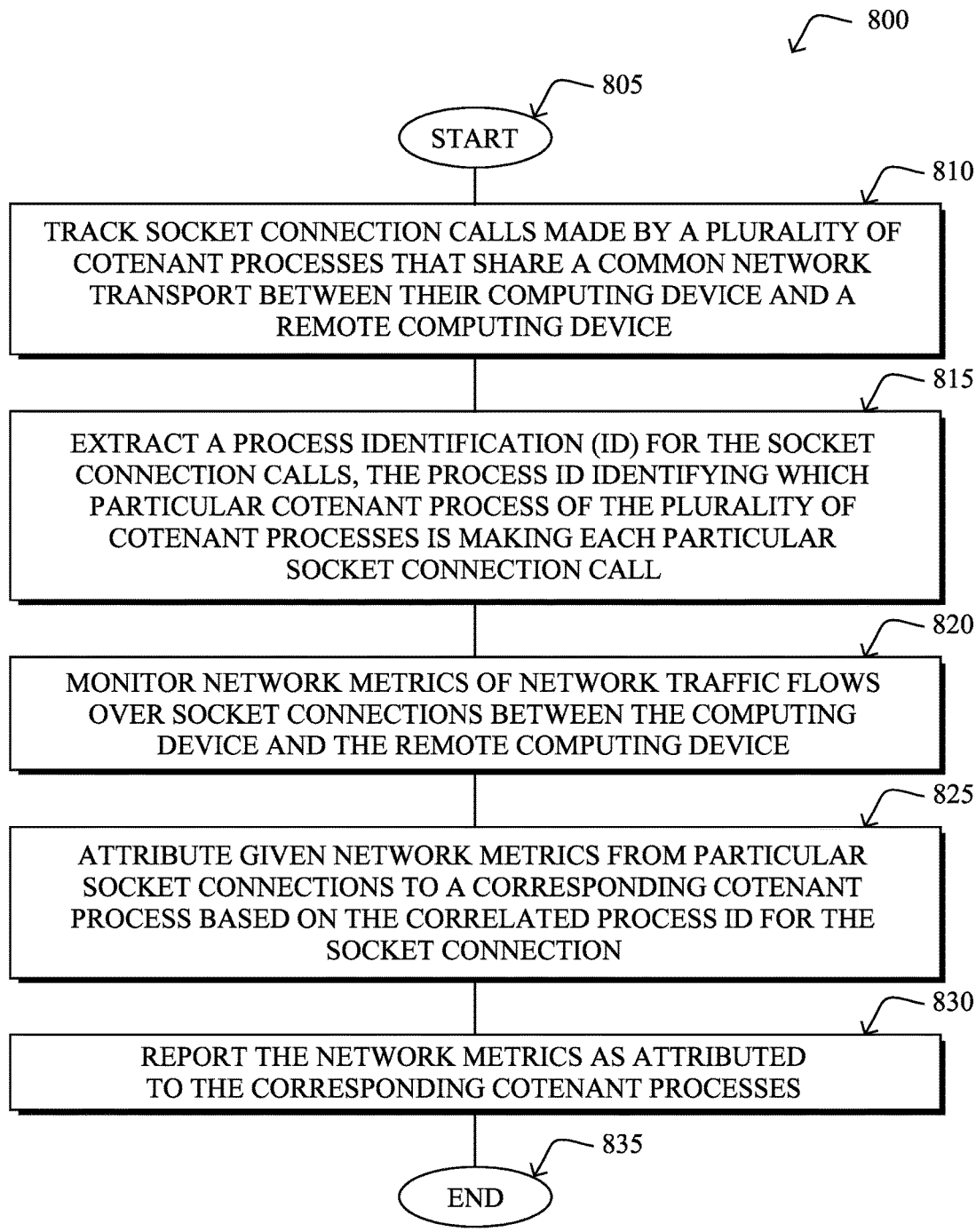
FIG. 8 illustrates an example procedure for network visibility for cotenant processes, particularly from the perspective of a network agent on a computing device.

FIG. 8 illustrates an example procedure for network visibility for cotenant processes in accordance with one or more embodiments described herein, particularly from the perspective of an agent (e.g., network agent 710) on a communicating device (e.g., associated with an operating system of a computing device). For example, one or more non-generic, specifically configured devices may perform procedure 800 by executing stored instructions (e.g., a library that an operating system tells the plurality of cotenant processes to use for the socket connections). The procedure may start at step 805, and continues to step 810, where, as described in greater detail above, a network agent tracks socket connection calls made by a plurality of cotenant processes 615 on the computing device that share a common network transport between the computing device and a remote computing device 650.

In step 815, the network agent extracts a process ID for the socket connection calls, where, as described above, the process ID identifies which particular cotenant process of the plurality of cotenant processes is making each particular socket connection call. Notably, as mentioned above, the cotenant processes may be sending and/or receiving traffic, and as such, the socket connections may correspond to outbound traffic from the computing device (where corresponding cotenant processes initially connect the socket connections) or else to inbound traffic to the computing device (where corresponding cotenant processes accept the incoming socket connections).

In step 820, the network agent may then monitor network metrics of network traffic flows over socket connections between the computing device and the remote computing device, and in step 825 attributes given network metrics from particular socket connections to a corresponding cotenant process based on the correlated process ID for the socket connection (e.g., per-process throughput, per-process packet drops, etc.).

The network agent may then report, in step 830, the network metrics as attributed to the corresponding cotenant processes. For instance, though a graphical user interface (GUI) local to the host device 610 may benefit from the information obtained herein, on one or more particular embodiments herein the network agent may transmit the network metrics as attributed to the corresponding cotenant processes to a central controller 320/490 as described above. Additionally, as described above, the network traffic flows may have embedded transaction identifiers (e.g., GUIDs) that correspond to particular trackable transactions occurring within one or more of the plurality of cotenant processes, and the network agent may either provide such identifiers, or else these identifiers are merely passed through the connection for processing by other devices in the computer network (e.g., in accordance with the application intelligence platform as described above).

The simplified example procedure 800 may then end in step 835, notably with the ability to continue isolating cotenant processes and their associated traffic.

Figure 9:
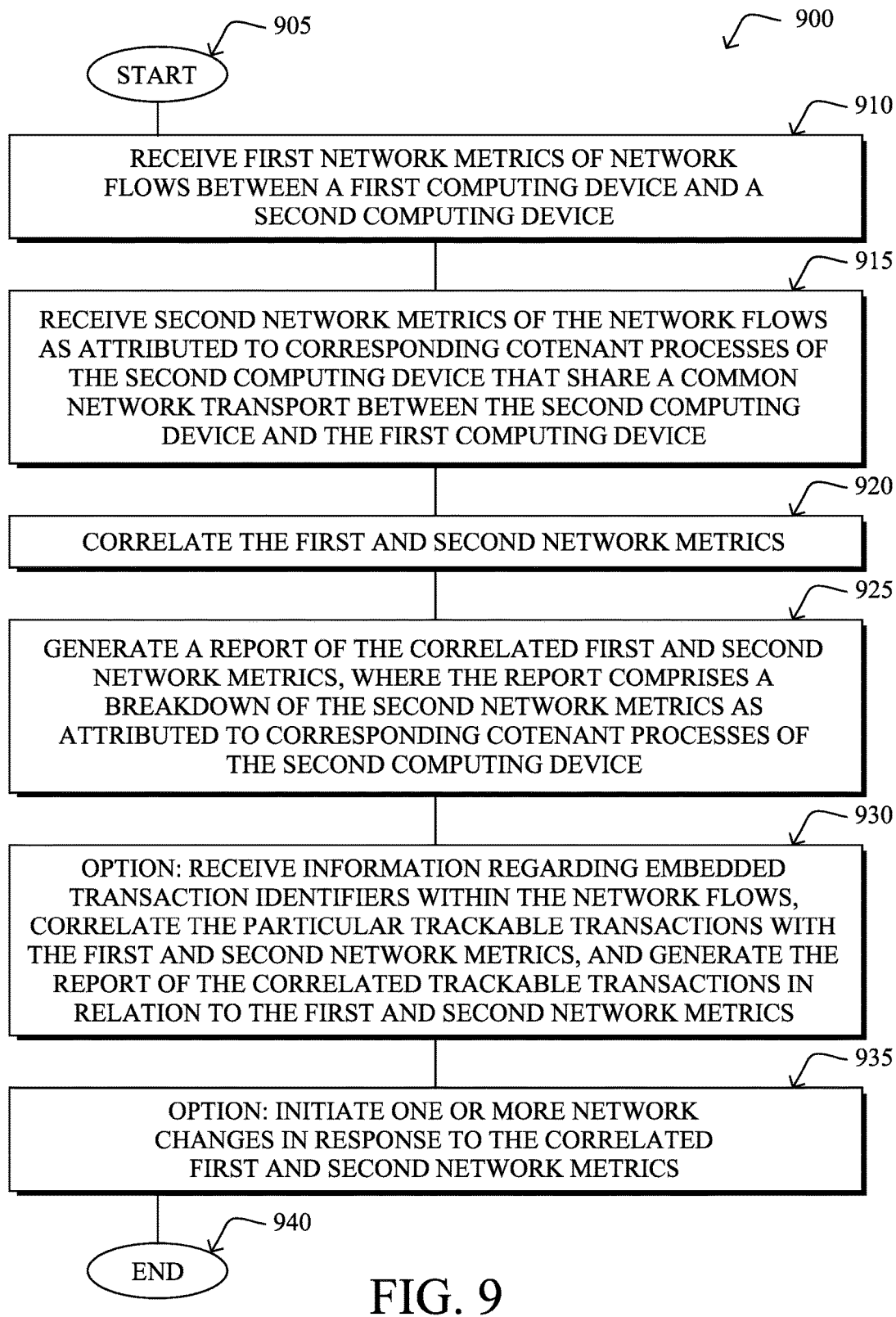
FIG. 9 illustrates another example procedure for network visibility for cotenant processes, particularly from the perspective of a controller in a computer network.

Additionally, FIG. 9 illustrates another example procedure for network visibility for cotenant processes in accordance with one or more embodiments described herein, particularly from the perspective of a controller. For example, one or more non-generic, specifically configured devices may perform procedure 900 by executing stored instructions. The procedure may start at step 905, and continues to step 910, where, as described in greater detail above, the controller receives (e.g., from a network agent) first network metrics of network flows between a first computing device (e.g., Host 650) and a second computing device (e.g., Host 610). Also in step 915, the controller further receives second network metrics of the network flows as attributed to corresponding cotenant processes 615 of the second computing device that share a common network transport between the second computing device and the first computing device. As described above, these second network metrics may be received from another network agent associated with the second computing device that is configured to attribute given network metrics from particular socket connections to a corresponding cotenant process based on a correlated process ID for the socket connection (e.g., as described in procedure 800 of FIG. 8 above).

In step 920, the controller may then correlate the first and second network metrics, such that in step 925 the controller may generate a report of the correlated first and second network metrics, where the report comprises a breakdown of the second network metrics as attributed to corresponding cotenant processes of the second computing device.

Optionally, in step 930, when the network traffic flows have embedded transaction identifiers that correspond to particular trackable transactions occurring within one or more of the plurality of cotenant processes, then the controller may receive information regarding the embedded transaction identifiers within the network flows, correlate the particular trackable transactions with the first and second network metrics, and generate a report of the correlated trackable transactions in relation to the first and second network metrics.

Also optionally, in step 935 the network controller may be configured to initiate one or more network changes (e.g., remediation, refinement, etc.) in response to the correlated first and second network metrics.

The simplified example procedure 900 may then end in step 940, notably with the ability to continue receiving updated metrics and generating reports according to isolated cotenant process traffic flows.

It should be noted that certain steps within procedures 800 and 900 may be optional as described above, and the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800 and 900 are described separately, certain steps from each procedure may be incorporated into each other procedure, and the procedures are not meant to be mutually exclusive.

The techniques described herein, therefore, provide for network visibility for cotenant processes. In particular, the techniques herein provides a mechanism to classify the traffic on a host by mapping cotenant application flows to network flows. Without marking or tagging packets, and without requiring specific existence of identifiable port numbers for applications, and without requiring deep packet inspection or decrypting technologies and keys, the techniques herein can use socket connection instrumentation to isolate cotenant process metrics. Embodiments herein, therefore, provide for greater insight into the network metrics of particular applications, as well as the potential for correlating these attributed network metrics to business transaction reporting according to the application intelligence platform described above.

In particular, in still further embodiments of the techniques herein, a business impact of cotenant process metrics can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other cotenant processes remain unaffected. The techniques herein, therefore, isolate cotenant process and their network metrics in order to better correlate business transactions to metrics attributed to those individual processes, accordingly.

While there have been shown and described illustrative embodiments that provide for network visibility for cotenant processes, it is to be understood that various other adaptations and modifications may be made within the spirit and scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described herein. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.).

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

tracking, by a network agent associated with an operating system of a computing device, socket connection calls made by a plurality of cotenant processes on the computing device that share a common network transport between the computing device and a remote computing device;

extracting, by the network agent, a process identification (ID) for the socket connection calls, the process ID identifying which particular cotenant process of the plurality of cotenant processes is making each particular socket connection call;

monitoring, by the network agent, network metrics of network traffic flows over socket connections between the computing device and the remote computing device;

attributing, by the network agent, given network metrics from particular socket connections to a corresponding cotenant process based on the correlated process ID for the socket connection; and reporting, by the network agent, the network metrics as attributed to the corresponding cotenant processes.

2. The method as in claim 1, wherein reporting comprises:

transmitting the network metrics as attributed to the corresponding cotenant processes to a central controller.

3. The method as in claim 1, wherein the socket connections correspond to outbound traffic from the computing device, and wherein corresponding cotenant processes initially connect the socket connections.

4. The method as in claim 1, wherein the socket connections correspond to inbound traffic to the computing device, and wherein corresponding cotenant processes accept the incoming socket connections.

5. The method as in claim 1, wherein the network agent is a library that the operating system tells the plurality of cotenant processes to use for the socket connections.

6. The method as in claim 1, wherein the network metrics as attributed to the corresponding cotenant processes are selected from a group consisting of: per-process throughput; and per-process packet drops.

7. The method as in claim 1, wherein the network traffic flows have embedded transaction identifiers that correspond to particular trackable transactions occurring within one or more of the plurality of cotenant processes.

8. A tangible, non-transitory, computer-readable medium storing program instructions that cause a computer to execute a process comprising:
    tracking socket connection calls made by a plurality of cotenant processes on the computer that share a common network transport between the computer and a remote computing device;
    extracting a process identification (ID) for the socket connection calls, the process ID identifying which particular cotenant process of the plurality of cotenant processes is making each particular socket connection call;
    monitoring network metrics of network traffic flows over socket connections between the computer and the remote computing device;
    attributing given network metrics from particular socket connections to a corresponding cotenant process based on the correlated process ID for the socket connection; and
    reporting the network metrics as attributed to the corresponding cotenant processes.

9. The computer-readable medium as in claim 8, wherein reporting comprises:
    transmitting the network metrics as attributed to the corresponding cotenant processes to a central controller.

10. The computer-readable medium as in claim 8, wherein the socket connections correspond to outbound traffic from the computer, and wherein corresponding cotenant processes initially connect the socket connections.

11. The computer-readable medium as in claim 8, wherein the socket connections correspond to inbound traffic to the computing device, and wherein corresponding cotenant processes accept the incoming socket connections.

12. The computer-readable medium as in claim 8, wherein the program instructions are a library that the operating system tells the plurality of cotenant processes to use for the socket connections.

13. The computer-readable medium as in claim 8, wherein the network metrics as attributed to the corresponding cotenant processes are selected from a group consisting of: per-process throughput; and per-process packet drops.

14. The computer-readable medium as in claim 8, wherein the network traffic flows have embedded transaction identifiers that correspond to particular trackable transactions occurring within one or more of the plurality of cotenant processes.

15. A method, comprising:
    receiving, at a controller, first network metrics of network flows between a first computing device and a second computing device, the first network metrics received from a first network agent associated with the first computing device;
    receiving, at the controller, second network metrics of the network flows as attributed to corresponding cotenant processes of the second computing device that share a common network transport between the second computing device and the first computing device, the second network metrics received from a second network agent associated with the second computing device and configured to attribute given network metrics from particular socket connections to a corresponding cotenant process based on a correlated process identification (ID) for the socket connection;
    correlating, by the controller, the first and second network metrics; and
    generating, by the controller, a report of the correlated first and second network metrics, wherein the report comprises a breakdown of the second network metrics as attributed to corresponding cotenant processes of the second computing device.

16. The method as in claim 15, wherein the socket connections correspond to outbound traffic from the computing device, and wherein corresponding cotenant processes initially connect the socket connections.

17. The method as in claim 15, wherein the socket connections correspond to inbound traffic to the computing device, and wherein corresponding cotenant processes accept the incoming socket connections.

18. The method as in claim 15, wherein the network metrics as attributed to the corresponding cotenant processes are selected from a group consisting of: per-process throughput; and per-process packet drops.

19. The method as in claim 15, wherein the network traffic flows have embedded transaction identifiers that correspond to particular trackable transactions occurring within one or more of the plurality of cotenant processes, wherein the method further comprises:
    receiving information regarding the embedded transaction identifiers within the network flows;
    correlating the particular trackable transactions with the first and second network metrics; and
    generating the report of the correlated trackable transactions in relation to the first and second network metrics.

20. The method as in claim 15, further comprising:
    initiating one or more network changes in response to the correlated first and second network metrics.

* * * * *